US012584016B2

(12) United States Patent
Fukui et al.

(10) Patent No.: US 12,584,016 B2
(45) Date of Patent: Mar. 24, 2026

(54) CURABLE ELASTOMER COMPOSITION, CURED PRODUCT OF SAME, FILM PROVIDED WITH CURED PRODUCT, MULTILAYER BODY PROVIDED WITH FILM, METHOD FOR PRODUCING SAID MULTILAYER BODY, ELECTRONIC COMPONENT AND DISPLAY DEVICE EACH COMPRISING CURED PRODUCT, METHOD FOR DESIGNING CURABLE ELASTOMER COMPOSITION AND METHOD FOR DESIGNING TRANSDUCER DEVICE

(71) Applicant: DOW TORAY CO., LTD., Tokyo (JP)

(72) Inventors: Hiroshi Fukui, Ichihara (JP); Takeaki Tsuda, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 778 days.

(21) Appl. No.: 17/786,569

(22) PCT Filed: Dec. 21, 2020

(86) PCT No.: PCT/JP2020/047670
§ 371 (c)(1),
(2) Date: Jun. 17, 2022

(87) PCT Pub. No.: WO2021/125353
PCT Pub. Date: Jun. 24, 2021

(65) Prior Publication Data
US 2023/0015553 A1     Jan. 19, 2023

(30) Foreign Application Priority Data

Dec. 20, 2019     (JP) ................................ 2019-230666

(51) Int. Cl.
*C08L 83/04*          (2006.01)
(52) U.S. Cl.
CPC ........... *C08L 83/04* (2013.01); *C08L 2205/02* (2013.01)
(58) Field of Classification Search
None
See application file for complete search history.

(56) References Cited

U.S. PATENT DOCUMENTS 5,405,929 A * 4/1995 Kobayashi .............. C08L 83/04
                                                            528/15
5,981,682 A * 11/1999 Onishi ................... C09J 183/04
                                                            524/847

2013/0023109 A1 * 1/2013 Harkness ............ H01L 21/6835
                                                            257/E21.211
2015/0344671 A1   12/2015 Furukawa et al.
2015/0380636 A1   12/2015 Fujisawa et al.
2017/0190939 A1 * 7/2017 Hori .......................... B32B 5/02
2019/0127531 A1   5/2019 Fukui et al.
2020/0071527 A1   3/2020 Fukui et al.

FOREIGN PATENT DOCUMENTS

CN      110573576 A    12/2019
JP      2016503108 A    2/2016
JP      2016505693 A    2/2016
JP      2019195950 A   11/2019
WO      2006070947 A1   7/2006
WO      2014105959 A1   7/2014
WO      2015098072 A1   7/2015
WO      2017183541 A1  10/2017

OTHER PUBLICATIONS

Machine assisted English translation of WO2006070947A1 obtained from https://patents.google.com/patent on Mar. 2, 2023, 10 pages.
International Search Report and Written Opinion (with translation of search report) for PCT/JP2020/047670 dated Mar. 2, 2021, 9 pages.

(Continued)

*Primary Examiner* — Robert S Jones, Jr.
*Assistant Examiner* — Lily K Sloan
(74) *Attorney, Agent, or Firm* — Warner Norcross + Judd LLP

(57)          ABSTRACT

Performance requirements of electroactive polymer materials used for transducer devices include dielectric breakdown strength, Young's modulus, dielectric constant, thickness, and electromechanical instability. There are correlation relationships therebetween but definitions of the correlation relationships have not been achieved. Therefore, it is necessary to search for an excellent material by trial and error, which requires a great deal of work. Disclosed herein is a curable elastomer composition that includes a compound having a high dielectric functional group. A cured product of the composition satisfies the following formula:

$$E = \alpha \left( \frac{Y}{\varepsilon_0 \varepsilon_r} \right)^{0.5}$$

where E is the dielectric breakdown strength in the range of 50 V/μm to 200 V/μm, $\alpha$ is a constant in the range of 0.4 to 0.9, Y is Young's modulus and is in the range of 0.001 MPa to 10 MPa, $\varepsilon_\gamma$ is a specific dielectric constant and is 100 or less, and $\varepsilon_0$ represents the dielectric constant of vacuum.

20 Claims, No Drawings

(56) References Cited

OTHER PUBLICATIONS

Machine assisted English translation of JP2019195950 obtained from https://patents.google.com/patent on Nov. 9, 2022, 8 pages.
Krakovsky et al., "A few remarks on the electrostriction of elastomers", Journal of Applied Physics, 85(1), (1999) pp. 628-629.
Thakur et al., "Electrostriction and electromechanical coupling in elastic dielectrics at nanometric interfaces", Materials Science-Poland. vol. 27 (2009) pp. 839-850.
Zakaria, S. B. (2016). Electrical Breakdown and Mechanical Ageing in Dielectric Elastomers. Danmarks Tekniske Universitet (DTU). Source: https://backend.orbit.dtu.dk/ws/portalfiles/portal/124925718/Afhandling_Shamsul_Bin_Zakaria.pdf (accessed Nov. 10, 2022).

* cited by examiner

CURABLE ELASTOMER COMPOSITION, CURED PRODUCT OF SAME, FILM PROVIDED WITH CURED PRODUCT, MULTILAYER BODY PROVIDED WITH FILM, METHOD FOR PRODUCING SAID MULTILAYER BODY, ELECTRONIC COMPONENT AND DISPLAY DEVICE EACH COMPRISING CURED PRODUCT, METHOD FOR DESIGNING CURABLE ELASTOMER COMPOSITION AND METHOD FOR DESIGNING TRANSDUCER DEVICE

CROSS-REFERENCE TO RELATED APPLICATIONS

This application is the U.S. National Stage of International Application No. PCT/JP2020/047670 filed on 21 Dec. 2020, which claims priority to and all advantages of Japanese Patent Application No. 2019-230666 filed on 20 Dec. 2019, the content of which is incorporated herein by reference.

TECHNICAL FIELD

The present invention relates to a curable elastomer composition and cured product thereof, a cured product film, a laminate body provided with film and manufacturing method thereof, an electronic component or display device having cured product, a curable elastomer design method, and transducer device design method.

BACKGROUND ART

A transducer device is an element or apparatus such as an actuator, sensor, generator, or the like that is a replacement for conventional technology such as a motor or the like and that converts kinetic energy or the like into electrical energy or electrical energy into kinetic energy or the like. The electroactive polymer material that can be used for the dielectric layer or electrode layer in a transducer device needs to have adequate performance of mechanical properties such as tensile strength, tear strength, and stretching, as well as electrical properties such as a specific dielectric constant and dielectric breakdown strength.

Non-Patent Document 1 discloses that there are two causes of stress and strain induced in an isotropic dielectric by an electrostatic field. One is Maxwell stress caused by the change of the electric field distribution in the dielectric due to the strain, and the other is the electrostriction related to dielectric property changes of the material that accompany the strain. It is disclosed that the stress and strain resulting from both effects are quadratic functions of the magnitude of the electric field. In addition, Non-Patent Document 1 discloses that an accurate evaluation of electrostriction is in particular necessary for evaluation of electromechanical properties of an electroactive polymer material having a low Young's modulus such as a crosslinked polymer. Although a correlation relationship was shown between changes in Young's modulus and thickness with electric field strength, there is no mention regarding dielectric breakdown strength and the document did not amount to defining a correlation relationship of the dielectric breakdown strength, specific dielectric constant, Young's modulus, and the like.

Non-Patent Document 2 discloses that deformation of an electroactive polymer material, which had not been previously considered, affects the electrical properties of the electroactive polymer material, and therefore a microscopic evaluation of the amount of deformation is needed. Although a correlation relationship was shown between amount of deformation and Young's modulus with electric field strength, there is no mention regarding dielectric breakdown strength and the document did not amount to defining a correlation relationship of the dielectric breakdown strength, specific dielectric constant, and Young's modulus and the like.

Non-Patent Document 3 discloses that regarding the breakdown of electrical insulation of an electroactive polymer material, if only dielectric breakdown strength is increased, other properties such as electrical durability will be impaired. In addition, modeling of the electrothermal breakdown of a polydimethylsiloxane elastomer as well as the specific dielectric constant and electric conductivity being significantly affected by the electrothermal dielectric breakdown of polydimethylsiloxane elastomer were disclosed. Also, the significant effect of deformation amount, thickness, and electromechanical instability of the electroactive polymer material on electrical dielectric breakdown strength is disclosed. However, the correlation relationship thereof was not defined.

RELATED ART DOCUMENTS

Patent Documents

Patent Document 1: WO 2014/105959

Non-Patent Documents

Non-Patent Document 1: Krakovsky, I.; Romijn, T.; Posthuma De Boer, A. J. Appl. Phys., 85, 628, 1999.
Non-Patent Document 2: Thakur, O. P.; Singh, A. K. Mater. Sci.-Poland, 27, 2009.
Non-Patent Document 3: Bin, Z. S.; Ladegaard, S. A. Technical University of Denmark Ph.D. thesis, 2016.

SUMMARY OF THE INVENTION

Problem to be Solved by the Invention

Performance requirements for electroactive polymer materials used in transducer devices include dielectric breakdown strength, Young's modulus, dielectric constant, thickness, and electromechanical instability, and conventional technology shows that there are correlation relationships therebetween that impact the electromechanical properties and electrical durability. However, the correlation relationship thereof was not defined. Therefore, in order to select an optimum electroactive polymer material to use for a transducer device, it is necessary to search for an excellent material by trial and error, which requires a great deal of work. Also, supplying of an electroactive polymer material that satisfies all requirements has not yet been feasible.

In order to solve the problems of conventional technology described above, an object of the present invention is to provide an optimum curable elastomer composition and cured product thereof provided with mechanical properties and electrical properties suitable for forming a transducer device.

In addition, another object of the present invention is to provide an efficient method for designing a curable elastomer composition not dependent on trial and error, and a method for designing a transducer device.

Means to Solve the Problem

As a result of conducting diligent research on the problems described above, the present inventors arrived at the present invention. In other words, the object of the present invention is achieved using a curable elastomer composition that includes a compound having a high dielectric functional group and the cured product, which satisfies the following formula:

[Eq. 1]

$$E = \alpha \left( \frac{Y}{\varepsilon_0 \varepsilon_r} \right)^{0.5}$$

(where, E is the dielectric breakdown strength in the range of 50 V/μm to 200 V/μm measured using a rigid electrode, α is a constant in the range of 0.4 to 0.9, Y is Young's modulus and is in the range of 0.001 MPa to 10 MPa, $\varepsilon_\gamma$ is a specific dielectric constant and is 100 or less, and $\varepsilon_0$ represents the dielectric constant of vacuum).

The curable elastomer composition is preferably cured by one or more curing reaction mechanisms selected from hydrosilylation reaction curing, condensation reaction curing, radical reaction curing, and a high energy ray curing reaction.

The curable elastomer composition preferably includes:
(A) an organopolysiloxane with a curing reactive group having at least two carbon-carbon double bonds in one molecule;
(B) an organohydrogenpolysiloxane having at least two silicon atom-bonded hydrogen atoms in one molecule; and
(C) a hydrosilylation reaction catalyst.

Regarding the curable elastomer composition, component (A) is preferably an organopolysiloxane or mixture thereof including:
(a1) a straight chain or branched chain organopolysiloxane having an alkenyl group only at an end of a molecular chain; and optionally
(a2) an organopolysiloxane resin containing an alkenyl group having at least one branched siloxane unit in a molecule with vinyl $(CH_2{=}CH{-})$ group content within a range of 1.0 to 5.0 mass %.

The compound having the high dielectric functional group in the curable elastomer composition is preferably an organopolysiloxane or an organohydrogenpolysiloxane.

A part or all of component (A) or component (B) is preferably an organopolysiloxane or organohydrogenpolysiloxane having the high dielectric functional group of the curable elastomer composition.

A part or all of the curable elastomer composition component (A) or component (B) is preferably an organopolysiloxane or organohydrogenpolysiloxane having a fluoroalkyl group expressed by $C_p F_{2p+1}{-}R{-}$ (where R represents an alkylene group with 1 to 10 carbon atoms, and p represents an integer between 1 and 8).

The curable elastomer composition is preferably for transducer devices.

The present invention also relates to a cured product of the curable elastomer composition of the present invention.

The present invention also relates to an electronic component or display device having a cured product of the present invention.

The present invention also relates to a film including the cured product of the present invention.

The present invention also relates to a laminate body including the film and the release layer of the present invention.

The present invention also relates to a method of manufacturing a laminate body, including:
a step of applying a thin film of the curable elastomer composition of the present invention on a separator having a release layer, where the thickness after curing is 1 to 1,000 μm; and
a step of curing the curable elastomer composition applied in a thin film.

The manufacturing method preferably further includes a rolling process.

The present invention also relates to a method of designing a curable elastomer composition, including:
a step of selecting components such that the cured product satisfies the following formula:

[Eq. 2]

$$E = \alpha \left( \frac{Y}{\varepsilon_0 \varepsilon_r} \right)^{0.5}$$

(where, E is the dielectric breakdown strength in the range of 50 V/μm to 200 V/μm measured using a rigid electrode, α is a constant in the range of 0.4 to 0.9, Y is Young's modulus and is in the range of 0.001 MPa to 10 MPa, $\varepsilon_\gamma$ is a specific dielectric constant and is 100 or less, and $\varepsilon_0$ represents the dielectric constant of vacuum).

The present invention also relates to a method for designing a transducer device, including:
a step of using a cured product of the curable elastomer composition selected according to the method for designing the curable elastomer composition according to claim 15.

Effects of the Invention

A cured product of the curable elastomer composition of the present invention can satisfy the mechanical and electrical property requirements for an electroactive polymer material used in a transducer device.

Furthermore, the method for designing a curable elastomer composition of the present invention enables designing the optimum curable elastomer composition and judging whether the curable elastomer composition has the necessary mechanical properties and electrical properties for an electroactive polymer material used in a transducer device based on a specific physical property value without using trial and error.

DESCRIPTION OF THE PREFERRED EMBODIMENT

[Curable Elastomer Composition]

Hereinafter, the curable elastomer composition of the present invention will be described in detail. The curable elastomer composition of the present invention contains a compound having a high dielectric functional group, and the cured product thereof satisfies the following formula.

[Eq. 3]

$$E = \alpha \left( \frac{Y}{\varepsilon_0 \varepsilon_r} \right)^{0.5} \tag{1}$$

(where, E is the dielectric breakdown strength in the range of 50 V/μm to 200 V/μm measured using a rigid electrode, α is a constant in the range of 0.4 to 0.9, Y is Young's modulus and is in the range of 0.001 MPa to 10 MPa, $\varepsilon_\gamma$ is a specific dielectric constant and is 100 or less, and $\varepsilon_0$ represents the dielectric constant of vacuum).

The above equation is derived by the following. The dielectric breakdown strength E is treated as a parameter when the following Maxwell stress and elastic deformation force are balanced. Here, when measured, the dielectric breakdown strength E is a value measured using a rigid electrode, and hereinafter, the calculation formula of Maxwell stress or the like is stress measured using a rigid electrode.

[Eq. 4]

$$\text{Maxwell stress} = \frac{\varepsilon_0 \varepsilon_r}{2} \left(\frac{V}{d}\right)^2 \qquad (2)$$

(In the equation, V is the applied voltage, d is the film thickness, $\varepsilon_\gamma$ is a specific dielectric constant, and $\varepsilon_0$ is the dielectric constant of a vacuum. Note, Maxwell stress is the stress based on a condition of the electrode being rigid.)

[Eq. 5]

$$\text{Elastic deformation force} = Y_\varepsilon \qquad (3)$$

(In the equation, Y is Young's modulus and ε is strain.)

Considering that the deformation is a quadratic function when the electroactive polymer material is applied to the transducer, it is logical to express the strain ε using the true strain In ($d/d_0$) rather than the nominal strain (d is the film thickness during electrical stimulation, $d_0$ is the initial film thickness). When Maxwell stress and elastic deformation force are balanced, the following equation is obtained regarding a rigid electrode.

[Eq. 6]

$$V = d \left(\frac{2Y}{\varepsilon_0 \varepsilon_r}\right)^{0.5} \left(\ln(d_0/d)\right)^{0.5} \qquad (4)$$

Formula (5) (same as formula (1)) was obtained based on formula (4).

[Eq. 7]

$$E = V/d_0 = \alpha \left(\frac{Y}{\varepsilon_0 \varepsilon_r}\right)^{0.5} \qquad (5)$$

In the case of a rigid electrode, with a film thickness d at dielectric breakdown of $d_b$, α is a constant expressed by Eq. 6. In the present invention, one of the features of the invention is that this constant is in the range of 0.4 to 0.9, preferably 0.6 to 0.85.

[Eq. 8]

$$\alpha = \sqrt{2} \frac{d_b}{d_D} \sqrt{\ln\left(\frac{d_0}{d_b}\right)} \qquad (6)$$

On the other hand, the dielectric breakdown strength E can be measured using a compliant electrode, and can be treated as a parameter when Maxwell stress and elastic deformation force are balanced, as described below. The calculation method is shown below for reference.

[Eq. 9]

$$\text{Maxwell stress} = \varepsilon_0 \varepsilon_r \left(\frac{V}{d}\right)^2 \qquad (7)$$

Here, when the Maxwell stress and the elastic deformation force are balanced, the following equation is obtained for a compliant electrode.

[Eq. 10]

$$V = d \left(\frac{Y}{\varepsilon_0 \varepsilon_r}\right)^{0.5} \left(\ln(d_0/d)\right)^{0.5} \qquad (8)$$

Similar to the case for a rigid electrode, for the case of a compliant electrode, with a film thickness d at dielectric breakdown of $d_b$, α can be derived via the aforementioned Eq. (5) and is a constant expressed by Eq. (9). As can be easily understood from the comparison of the equations, the constant α generated under the condition of a rigid electrode is a value obtained by multiplying the constant α generated under the condition of a compliant electrode by the square root of 2.

[Eq. 11]

$$\alpha = \frac{d_b}{d_0} \sqrt{\ln\left(\frac{d_0}{d_b}\right)} \qquad (9)$$

[Dielectric Breakdown Strength]

Here, "dielectric breakdown strength" in the present specification is a measure of the dielectric breakdown resistance of the cured product film of the curable elastomer composition of the present invention under an applied direct current or alternating current voltage, where the dielectric breakdown strength value or dielectric breakdown voltage value is obtained by dividing the applied voltage prior to dielectric breakdown by the thickness of the film. In other words, the dielectric breakdown strength in the present invention is measured in units of potential difference with regard to the units of film thickness (in the present invention, Volt/micrometer (V/μm)). The dielectric breakdown strength can be measured using a rigid electrode by an electrical insulating oil breakdown voltage testing device (for example, Portatest 100A-2 manufactured by Soken Co., Ltd., or the like) having a program conforming to a standard such as JIS 2101-82 or the like.

In the formula described above, the dielectric breakdown strength E is a value measured using a rigid electrode, and is 50 V/μm to 200 V/μm, preferably 70 V/μm to 150 V/μm.

In the equation described above, α is a constant in the range of 0.4 to 0.9, preferably a constant in the range of 0.6 to 0.85. The closer the surface roughness of the obtained cured film is to smooth, the higher the value of α can be. In a highly smooth surface state where the surface of the cured film is close to a mirror surface, for example, α can become a value of 0.7 or more.

In the formula described above, Y is Young's modulus and is in the range of 0.001 MPa to 10 MPa, preferably 0.001 MPa to 2 MPa, and more preferably 0.001 MPa to 1.5 MPa.

In the formula described above, $\varepsilon_y$ is a specific dielectric constant of 100 or less, preferably 50 or less, and more preferably in the range of 1 to 10.

When E, $\alpha$, Y, and $\varepsilon_y$ as described above are within the above ranges, the cured product of the curable elastomer composition satisfies the mechanical properties and electrical properties required for an electroactive polymer material used in a transducer device.

The curable elastomer composition of the present invention is preferably a curable poly (meth) acrylic elastomer composition, a curable polyurethane elastomer composition, or a curable organopolysiloxane elastomer composition, and more preferably a curable organopolysiloxane elastomer composition.

The type of high dielectric functional group of the present invention is not particularly limited, with examples including: a) halogen atoms and groups containing a halogen atom expressed by 3,3,3-trifluoropropyl groups and the like; b) groups containing a nitrogen atom expressed by cyanopropyl groups and the like; c) groups containing an oxygen atom expressed by carbonyl groups and the like; d) heterocyclic groups such as imidazole groups and the like; e) groups containing a boron atom such as borate ester groups and the like; f) groups containing phosphorus such as phosphine groups and the like; and g) groups containing a sulfur atom such as thiol groups and the like. Halogen atoms including a fluorine atom and groups containing only a halogen atom are preferably used.

The compound having a high dielectric functional group of the present invention is not particularly limited as long as the compound has a high dielectric functional group indicated above, but is preferably an organopolysiloxane or organohydrogenpolysiloxane having a high dielectric functional group, an organic additive having a high dielectric functional group, or a non-reactive organosilicon compound having a high dielectric functional group, with an organopolysiloxane or organohydrogenpolysiloxane having a high dielectric functional group and a non-reactive organosilicon compound having a high dielectric functional group being particularly preferred.

The curable elastomer composition is preferably cured by one or more curing reaction mechanisms selected from hydrosilylation reaction curing, condensation reaction curing, radical reaction curing, and a high energy ray curing reaction and is more preferably cured by hydrosilylation reaction curing.

In Example 1, the curable elastomer composition preferably includes:

(A) an organopolysiloxane with a curing reactive group having at least two carbon-carbon double bonds in one molecule;

(B) an organohydrogenpolysiloxane having at least two silicon atom-bonded hydrogen atoms in one molecule; and (C) a hydrosilylation reaction catalyst.

The aforementioned component (A) is an organopolysiloxane having a curing reactive group containing a carbon-carbon double bond, with examples including straight chain, branched chain, cyclic, or resin (network) organopolysiloxanes containing a curing reactive group in a molecule, selected from among: vinyl groups, allyl groups, butenyl groups, pentenyl groups, hexenyl groups, heptenyl groups, octenyl groups, nonenyl groups, decenyl groups, undecenyl groups, dodecenyl groups, and other alkenyl groups with 2 to 20 carbon atoms; 3-acryloxypropyl groups, 4-acryloxibutyl groups, and other groups containing an acryl; and 3-methacryloxypropyl groups, 4-methacryloxibutyl groups, and other groups containing a methacryl group. An organopolysiloxane having a curing reactive group containing a carbon-carbon double bond, selected from among vinyl groups, allyl groups, and hexenyl groups is particularly preferable.

The organopolysiloxane serving as component (A) may contain a group selected from among monovalent hydrocarbon groups that do not have a carbon-carbon double bond in a molecule, hydroxyl groups, and alkoxy groups. Furthermore, a portion of the hydrogen atoms of the monovalent hydrocarbon group may be substituted with a halogen atom or a hydroxyl group. Examples of monovalent hydrocarbon groups include: alkyl groups such as methyl groups, ethyl groups, propyl groups, butyl groups, pentyl groups, hexyl groups, heptyl groups, octyl groups, nonyl groups, decyl groups, undecyl groups, dodecyl groups, and the like; aryl groups such as phenyl groups, tolyl groups, xylyl groups, naphthyl groups, anthracenyl groups, phenanthryl groups, pyrenyl groups, and the like; aralkyl groups such as benzyl groups, phenethyl groups, naphthyl ethyl groups, naphthyl propyl groups, anthracenyl ethyl groups, phenanthryl ethyl groups, pyrenyl ethyl groups, and the like; and groups in which a hydrogen atom of these aryl groups or aralkyl groups is substituted with a methyl group, ethyl group, or other alkyl group, a methoxy group, ethoxy group, or other alkoxy group, or halogen atom such as a chlorine atom, bromine atom, or the like. Note that when component (A) contains a hydroxyl group or the like, the component has condensation reactivity in addition to hydrosilylation reaction curability.

Preferably, component (A) may be an organopolysiloxane expressed by the following average composition formula:

$$R^1{}_a R^2{}_b SiO_{(4-a-b)/2}$$

or a mixture thereof.

In the formula, $R^1$ represents a curing reactive group containing a carbon-carbon double bond, $R^2$ represents a group selected from monovalent hydrocarbon groups that do not have a carbon-carbon double bond, hydroxyl groups, or alkoxy groups, and a and b represent numbers satisfying the following conditions: $1 \leq a+b \leq 3$ and $0.001 \leq a/(a+b) \leq 0.33$, and are preferably numbers satisfying the following conditions: $1.5 \leq a+b \leq 2.5$ and $0.005 \leq a/(a+b) \leq 0.2$. This is because the flexibility of the cured product increases when a+b are above the lower limit of the aforementioned range, while the mechanical strength of the cured product increases when a+b are below the upper limit of the range, and therefore, the mechanical strength of the cured product increases when a/(a+b) is above the lower limit of the range, while flexibility of the cured product increases when a/(a+b) is below the upper limit of the range.

In Example 1, component (A) of the present invention is particularly preferably an organopolysiloxane or a mixture thereof containing:

(a1) a straight chain or branched chain organopolysiloxane having an alkenyl group only at an end of a molecular chain; and optionally (a2) an organopolysiloxane resin containing an alkenyl group having at least one branched siloxane unit in a molecule with an amount of vinyl ($CH_2{=}CH{-}$) groups within a range of 1.0 to 5.0 mass %.

Component (a1) is a straight chain or branched chain organopolysiloxane having a siloxane unit expressed by $$(Alk)R^2{}_2SiO_{1/2}$$

(where Alk represents an alkenyl group having two or more carbon atoms) at an end of a molecular chain, and where other siloxane units are essentially only a siloxane unit expressed by $R^2_2SiO_{2/2}$. Note that $R^2$ represents the same group as described above. Furthermore, the degree of siloxane polymerization of component (a1) is within a range of 7 to 1002 including terminal siloxane units, but may be within a range of 102 to 902. This component (a1) is particularly preferably a straight chain organopolysiloxane where both ends of a molecular chain are blocked with a siloxane unit expressed by $(Alk)R^2_2SiO_{1/2}$.

Component (a2) is an organopolysiloxane resin containing an alkenyl group, which may optionally be used in combination with component (a1) described above. An example of component (a2) includes an organopolysiloxane resin containing an alkenyl group expressed by the following formula.

Average Unit Formula:

$$(RSiO_{3/2})o(R_2SiO_{2/2})p(R_3SiO_{1/2})q(SiO_{4/2})r(XO_{1/2})s$$

In the formula, R represents a group selected from alkenyl groups and monovalent hydrocarbon groups that do not have a carbon-carbon double bond, while X represents a hydrogen atom or an alkenyl group having 1 to 3 carbon atoms. However, of all Rs, R is an alkenyl group at least within a range in which the amount of vinyl ($CH_2$=$CH$—) groups in the organopolysiloxane resin satisfies a range of 1.0 to 5.0 mass %, and at least a portion of Rs in the siloxane unit represented by $RSiO_{1/2}$ are particularly preferably alkenyl groups.

In the formula, (o+r) is a positive integer, p is 0 or a positive integer, q is 0 or a positive integer, s is 0 or a positive integer, p/(o+r) is a number within a range of 0 to 10, q/(o+r) is a number within a range of 0 to 5, (o+r)/(o+p+q+r) is a number within a range of 0.3 to 0.9, and s/(o+p+q+r) is a number within a range of 0 to 0.4.

A particularly preferable example of component (a2) includes an MQ organopolysiloxane resin containing an alkenyl group expressed by $$\{(Alk)R^2_2SiO_{1/2}\}q1(R^2_3SiO_{1/2})q2(SiO_{4/2})r$$

(where Alk and $R^2$ represent the same groups as described above, q1+q2+r is a number within a range of 50 to 500, (q1+q2)/r is a number within a range of 0.1 to 2.0, and q2 is a number in a range where the number of vinyl ($CH_2$=$CH$—) groups in the organopolysiloxane resin satisfies a range of 1.0 to 5.0 mass %).

Using component (a1), having an alkenyl group only at an end of the molecular chain and component (a2) as an organopolysiloxane resin, having a certain number of alkenyl groups, can provide a curing reaction product with excellent curability as an entire composition with excellent flexibility and mechanical strength, and can provide an organopolysiloxane cured film that is particularly suitable for an adhesive layer or dielectric layer in the aforementioned electronic components and the like.

Component (B) is an organohydrogenpolysiloxane having at least two silicon atom-bonded hydrogen atoms in a molecule, and is a component that functions as a crosslinking agent for component (A).

Examples of this component (B) include: 1,1,3-3-tetramethyldisiloxane, 1,3,5,7-tetramethyl cyclotetrasiloxane, tris(dimethylhydrogensiloxy)methylsilane, tris(dimethylhydrogensiloxy)phenylsilane, methylhydrogenpolysiloxanes blocked at both ends of a molecular chain with a trimethylsiloxy group, dimethylsiloxane/methylhydrogensiloxane copolymers blocked at both ends of a molecular chain with a trimethylsiloxy group, dimethylpolysiloxane blocked at both ends of a molecular chain with a dimethylhydrogensiloxane group, dimethylsiloxane/methylhydrogensiloxane copolymers blocked at both ends of a molecular chain with a dimethylhydrogensiloxane group, methylhydrogensiloxane/diphenylsiloxane copolymers blocked at both ends of a molecular chain with a trimethylsiloxy group, methylhydrogensiloxane/diphenylsiloxane/dimethylsiloxane copolymers blocked at both ends of a molecular chain with a trimethylsiloxy group, hydrolytic condensates of a trimethylsilane, copolymers containing $(CH_3)_2HSiO_{1/2}$ units and $SiO_{4/2}$ units, copolymers containing $(CH_3)_2HSiO_{1/2}$ units, $SiO_{4/2}$ units, and $(C_6H_5)SiO_{3/2}$ units, and mixtures of two or more types thereof.

The amount of component (B) used is an amount where the silicon atom-bonded hydrogen atoms are within a range of 0.1 to 10 mols, more preferably 0.1 to 5.0 mols, and particularly preferably 0.1 to 2.5 mols, with regard to 1 mol of carbon-carbon double bonds in component (A) of the composition. Using an amount of component (B) that is less than the lower limit may cause curing defects. When the amount of component (B) exceeds the upper limit, the mechanical strength of the cured product may be too high and the desired physical properties of an adhesive layer or dielectric layer may not be obtainable. However, in order to improve the adhesive strength of the organopolysiloxane cured film of the present invention to glass or other adherend or the like, having silicon atom-bonded hydrogen atoms in a range exceeding 20 mols with regard to 1 mol of carbon-carbon double bonds in component (A) is acceptable.

Component (C) is a catalyst that promotes a hydrosilylation reaction between component (A) and component (B). Examples include platinum based catalysts, rhodium based catalysts, palladium based catalysts, nickel based catalysts, iridium based catalysts, ruthenium based catalysts, and iron based catalysts. Platinum based catalysts are preferable. Examples of platinum based catalysts include platinum based compounds, such as platinum fine powders, platinum black, platinum-supporting silica fine powders, platinum-supporting activated carbon, chloroplatinic acids, alcohol solutions of chloroplatinic acids, olefin complexes of platinum, alkenylsiloxane complexes of platinum, and the like. Alkenylsiloxane complexes of platinum are particularly preferable. Examples of the alkenylsiloxane include 1,3-divinyl-1,1,3,3-tetramethyldisiloxane, 1,3,5,7-tetramethyl-1,3,5,7-tetravinylcyclotetrasiloxane, alkenylsiloxanes having part of the methyl groups of these alkenylsiloxane substituted by ethyl groups, phenyl groups, or the like, and alkenylsiloxanes having vinyl groups of these alkenylsiloxane substituted by allyl groups, hexenyl groups, or the like. The platinum-alkenyl siloxane complex has favorable stability, so 1,3-divinyl-1,1,3,3-tetramethyldisiloxane is particularly preferable. Furthermore, the stability of the platinum-alkenylsiloxane complex can be improved. Therefore, 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, and 1,3,5,7-tetramethyl-1,3,5,7-tetravinylcyclotetrasiloxane, or other alkenylsiloxane or dimethylsiloxane oligomers or other organosiloxane oligomers are preferably added to the complex, with an alkenylsiloxane particularly preferably added to the complex. In addition, from the perspective of improving handling workability and pot life of the composition, these hydrosilylation reaction catalysts may be thermoplastic resin particles containing a hydrosilylation reaction catalyst, which are catalysts dispersed or encapsulated in a thermoplastic resin such as a silicone resin, a polycarbonate resin, an acrylic resin, or the like, and particularly may be thermoplastic resin particles including a hydrosilylation reaction catalyst that contains platinum. As the catalyst for promoting the hydrosilylation reaction, a non-platinum based metal catalyst such as iron, ruthenium, iron/cobalt, or the like may be used.

The amount of component (C) used is an effective amount and is not particularly limited so long as the amount promotes curing of the curable organopolysiloxane composition of the present invention. Specifically, in mass units, metal atoms in the catalyst are of an amount within a range of 0.01 to 10,000 ppm, and preferably, the platinum metal atoms in component (C) are of an amount within a range of 0.1 to 5,000 ppm, with regard to the sum (100 mass % as a whole) of components (A) to (C). This is because when the amount of component (C) is less than the lower limit of the aforementioned range, curing may be insufficient. Moreover, exceeding the upper limit of the range may be uneconomical and potentially adversely affect transparency, such as by coloring of the obtained cured product and the like.

In Example 1, a part or all of component (A) or component (B) is preferably an organopolysiloxane or organohydrogenpolysiloxane having a high dielectric functional group.

10 mol % or more, preferably 20 mol % or more, and more preferably 40 mol % or more of all substitution groups on the silicon atoms in the organopolysiloxane or organohydrogenpolysiloxane, which is component (A) or component (B), are preferably substituted by a high dielectric functional group. By adjusting the amount of the high dielectric functional group introduced, a curable elastomer composition having optimal miscibility in the curable elastomer composition and optimal specific dielectric constant ($\varepsilon_\gamma$) of the cured product can be obtained.

In Example 1, a part or all of the curable elastomer composition component (A) or component (B) is preferably an organopolysiloxane or organohydrogenpolysiloxane having a fluoroalkyl group expressed by $C_pF_{2p+1}$—R— (where R represents an alkylene group with 1 to 10 carbon atoms, and p represents an integer between 1 and 8).

Such a fluoroalkyl group yields a cured product having an excellent specific dielectric constant, in addition to yielding a cured product in which each component has fluorine atoms, giving each component improved compatibility and giving the cured product excellent transparency. Specific examples of the fluoroalkyl group include trifluoropropyl groups, pentafluorobutyl groups, heptafluoropentyl groups, nonafluorohexyl groups, undecafluoroheptyl groups, tridecafluorooctyl groups, pentadecafluorononyl groups, and heptadecafluorodecyl groups. Of these, in terms of the dielectric properties, economy, ease of manufacturing, and moldability of the obtained curable organopolysiloxane composition, a group in which p=1, in other words, a trifluoropropyl group, is preferable.

In addition to the aforementioned components, other components may be added, if necessary, to the curable elastomer composition according to the present invention so long as the object of the present invention is not impaired. Examples of other components include solvent (D), hydrosilylation reaction inhibitors (E), mold release agents, insulating additives, adhesion improving agents (G), heat resistance improving agents, pigments, and the like, and various other conventionally known additives. For example, an inorganic filler can be added for the purpose of adjusting the overall viscosity or improving functionality, such as improving the dielectric properties and the like.

[Solvent (D)]

When the curable elastomer composition is a solid or is highly viscous, organic solvents or a mixture of solvents thereof improve the miscibility and handleability and are used for achieving uniform dispersion, reducing the overall viscosity, and forming a thin film with a uniform film shape. When a non-polar solvent such as benzene is used, the technical effect of the present invention may not be sufficiently realized, the curable elastomer composition may not be uniformly dispersed, and low viscosity may not be achieved.

Examples of organic solvents that are preferably used include one or more types of organic solvents selected from (D1) organic polar solvents, (D2) low molecular weight siloxane solvents, and (D3) halogen solvents, or mixed solvents thereof with a boiling point of 80° C. or higher and less than 200° C. Note that the solvent may be a mixed solvent of different organic solvents of different or the same types at an arbitrary ratio. For example, the solvent may be a mixed solvent of (D1) an organic polar solvent and (D2) a low molecular weight siloxane solvent, a mixed solvent of (D1) an organic polar solvent and (D3) a halogen solvent, a mixed solvent of (D2) a low molecular weight siloxane solvent and (D3) a halogen solvent, a mixed solvent of all three of (D1) to (D3), or a mixed solvent of the same type of solvent, such as a mixed solvent of hexamethyldisiloxane and octamethyltrisiloxane, which are similar (D2) low molecular weight siloxane solvents. These organic solvents can be appropriately selected depending on the curable elastomer composition.

(D1) The organic polar solvent is preferably one or more types selected from cyclohexanone, isobutyl acetate, methyl ethyl ketone, methyl butyl ketone, methyl isobutyl ketone, N,N-dimethylformamide (DMF), N-hexaldehyde, acetone, benzaldehyde, methyl acetate, propyl acetate, acetophenone, pentyl acetate, butyraldehyde, ethyl methyl acetate, ethyl ether, and tetrahydrofuran (THF).

Similarly, (D2) the low molecular weight siloxane solvent is preferably one or more types selected from hexamethyldisiloxane, tetramethyldivinyldisiloxane, 2-methylphenethylpentamethyldisiloxane, octamethyltrisiloxane, and 1,3-difluorotetramethyldisiloxane.

Similarly, (D3) the halogen solvent is preferably one or more types selected from trifluoromethylbenzene, 1,2-bis(trifluoromethyl)benzene, 1,3-bis(trifluoromethyl)benzene, 1,4-bis(trifluoromethyl)benzene, trifluoromethylchlorobenzene, trifluoromethylfluorobenzene, and hydrofluoroether. In particular, higher content of the high dielectric functional group in the curable elastomer composition leads to an increased ratio of the halogen-based solvent used enabling achieving uniform miscibility and lower viscosity.

Particularly preferably, the organic solvents described above contain at least one low molecular weight siloxane solvent selected from among hexamethyldisiloxane, octamethyltrisiloxane, and mixtures thereof, which are commercially available from Dow Silicones Corporation under the names OST-10, OST-20, and OST-2. Furthermore, when the fluoroalkyl group content in the curable elastomer composition is high, the optional use of these low molecular weight siloxane solvents together with the halogen solvents described above is also included in a preferable form of the present invention.

Hydrosilylation Reaction Inhibitor (E)

A hydrosilylation reaction inhibitor (E) is added to suppress a crosslinking reaction from occurring between components (A) and (B), extend work life at ambient temperature, and improve storage stability.

Examples of the hydrosilylation reaction inhibitor (E) include acetylenic compounds, enyne compounds, organic nitrogen compounds, organic phosphorus compounds, and oxime compounds. Specific examples include: alkyne alcohols such as 3-methyl-1-butyne-3-ol, 3,5-dimethyl-1-hexyne-3-ol, 3-methyl-1-pentyne-3-ol, 1-ethynyl-1-cyclohexanol, phenyl butanol, and the like; enyne compounds such as 3-methyl-3-pentene-1-yne, 3,5-dimethyl-1-hexyne-3-yne, and the like; methylalkenylcyclosiloxanes such as 1,3,5,7-tetramethyl-1,3,5,7-tetravinylcyclotetrasiloxane, 1,3,5,7-tetramethyl-1,3,5,7-tetrahexenylcyclotetrasiloxane, and the like; as well as benzotriazoles.

The added amount of the hydrosilylation reaction inhibitor (E) is an amount to effectively extend the work life at normal temperatures of the curable elastomer composition according to the present invention and improve the storage stability. Normally, the range is 0.001 to 5 mass parts and preferably 0.01 to 2 mass parts per 100 mass parts of component (A), but appropriate selection is possible based on the type of the present component, the performance and amount of the platinum based catalyst, the amount of alkenyl groups in component (A), the number of silicon atom-bonded hydrogen atoms in component (B), and the like.

[Filler (F)]

In the curable elastomer composition of the present invention, a filler (F) may or may not be used, as desired. When a filler (F) is used, either or both of an inorganic filler and an organic filler may be used. The type of the filler (F) used is not particularly limited, and examples include high dielectric fillers, conductive fillers, insulating fillers, and reinforcing fillers. One or more types thereof can be used. In particular, the composition of the present invention can contain one or more fillers (F) selected from a group consisting of high dielectric fillers, conductive fillers, insulating fillers, and reinforcing fillers, in order to adjust the viscosity and provide functionality, so long as transparency, coatability, and handling workability are not impaired. From the perspective of improving mechanical strength, at least one or more reinforcing fillers are particularly preferably added. In particular, a portion or all of the filler (F) may be surface treated with one or more surface treating agents.

One or more fillers (F) may be used. The shape thereof is not particularly restricted, with any arbitrary shape including a particle shape, plate shape, needle shape, fibrous shape, and the like capable of being used. If the shape of the filler is a particulate, the particle size of the filler is not particularly limited and, for example, when measuring using a laser beam diffraction method or a dynamic light scattering method, the volume average particle size can be, for example, within a range of 0.001 to 500 μm. Furthermore, depending on the intended purpose of the filler, the volume average particle size of the filler can be 300 μm or less, 200 μm or less, 100 μm or less, 10 μm or less, or 0.01 μm or more, 0.1 μm or more, or 1 μm or more. If the shape of the filler is an anisotropic shape such as a plate shape, needle shape, or fibrous shape, the aspect ratio of the filler can be 1.5 or higher, 5 or higher, or 10 or higher. When fine particles having a volume average particle size of 0.01 μm or less and a maximum particle size of 0.02 μm or less are used, a cured product having substantially high transparency, particularly an adhesive film or electroactive layer film, can be manufactured.

[Reinforcing Filler]

In the present invention, from the perspective of the mechanical strength of the cured product, a preferred filler is one or more types of reinforcing inorganic fine particles having an average primary particle size of less than 50 nm.

Examples thereof include fumed silica, wet silica, ground silica, calcium carbonate, diatomaceous earth, finely ground quartz, various metal oxide powders other than alumina/zinc oxide, glass fibers, carbon fibers, and the like. Furthermore, these may be treated with various surface treating agents described later. Of these, silica is recommended.

Preferred examples thereof include hydrophilic or hydrophobic fumed silica or metal oxide composites thereof, with an average primary particle size that is 10 nm or less. The particles are partially aggregated, and the specific surface area thereof is 50 $m^2/g$ or more and 300 $m^2/g$ or less, from the perspective of improving mechanical strength. Further, from the viewpoint of improving dispersibility, fumed silica, or a metal oxide composite thereof treated with a disilazane such as hexa methyldisilazane or 1,3-Bis(3,3,3-trifluoropropyl)-1,1,3,3-tetramethyldisilazane or a silane coupling agent with a high dielectric functional group described below are preferable. Two or more types of the reinforcing inorganic particles may be used in combination.

By blending filler (F) into the composition, the mechanical strength and the dielectric breakdown strength of the cured product achieved by curing the curable elastomer composition according to the present invention can be increased. The added amount of these fillers (F) is within a range of 10 to 40 mass %, may be within a range of 15 to 35 mass %, and is particularly preferably within a range of 15 to 30 mass %, relative to the sum of components in the composition, which form a non-volatile solid fraction by a curing reaction. If the upper limit of the aforementioned mass % range is exceeded, a uniform and thin film coating may be difficult, while if the mass % is less than the lower limit of the aforementioned mass percentage range, the physical properties of the curable elastomer composition after curing may be insufficient.

A portion or all of the inorganic fine particles (irrespective of the particle size, function, and the like) used in the curable elastomer composition of the present invention may be surface treated with one or more surface treatment agents. The type of the surface treatment is not particularly limited, and examples thereof include hydrophilic treatment or hydrophobic treatment. Hydrophobic treatment is preferable. Hydrophobically treated inorganic fine particles can be used so as to be dispersed at a high filling rate in the composition. Furthermore, an increase in the viscosity of the composition is inhibited, thereby improving moldability.

The surface treatment can be performed by treating (or coating) the inorganic fine particles with a surface treating agent. Examples of a hydrophobic surface treating agent include at least one surface treating agent selected from a group consisting of organic titanium compounds, organosilicon compounds, organic zirconium compounds, organic aluminum compounds, and organic phosphorus compounds. The surface treating agent may be used independently or two or more types may be used in combination. Of the surface treating agents, organosilicon compounds and particularly silazanes, silanes, siloxanes, and polysiloxanes are preferably used, and those with a silazane, alkyltrialkoxysilane, or trialkoxysilylpolydimethylsiloxane at one end are most preferably used.

The amount of the surface treating agent with regard to the total amount of the filler in the surface treatment is preferably within a range of 0.1 mass % or more and 50 mass % or less, and more preferably within a range of 0.3 mass % or more and 30 mass % or less. Note that the treatment amount is preferably the feed ratio of fillers to the surface treating agent, with excess treating agents preferably removed following treatment. Furthermore, there is no problem in using additives and the like that promote or assist a reaction when treating if necessary.

[Other Functional Fillers]

Examples of other functional fillers include dielectric inorganic fine particles, conductive inorganic fine particles, insulating inorganic fine particles, and thermally conductive inorganic fine particles. One or more types selected from these microparticles can be used in the composition of the present invention. Note that the inorganic fine particles simultaneously may have two or more functions including functioning as a reinforcing filler, or the like.

Examples of preferred dielectric inorganic fine particles include one or more inorganic fine particles selected from a group consisting of composite metal oxides where a portion of barium and titanium sites of titanium oxide, barium titanate, strontium titanate, lead zirconate titanate, and barium titanate is substituted with calcium, strontium, yttrium, neodymium, samarium, dysprosium, or other alkaline earth metal, rare earth metals, or zirconium. Titanium oxide, barium titanate, zirconate titanate barium calcium, and strontium titanate are more preferable, and titanium oxide and barium titanate are even more preferable.

Specifically, at least a portion of the dielectric inorganic fine particles are particularly preferably dielectric inorganic fine particles with a specific dielectric constant at room temperature at 1 kHz of 10 or more. Note that the upper limit of the preferable size (average primary particle size) of the inorganic fine particles is 20,000 nm (20 μm), but more preferably 10,000 nm (10 μm), taking into consideration the processability into a thin film for a transducer described later. Using the dielectric inorganic fine particles may further improve the mechanical properties and/or the electrical properties, particularly the specific dielectric constant, of the curable elastomer composition cured product.

The conductive inorganic fine particles are not particularly limited so long as conductivity can be applied to the curable elastomer composition cured product. Specific examples thereof include: conductive carbon black, graphite, vapor phase growth carbon (VGCF), and other conductive carbons; and metal powders of platinum, gold, silver, copper, nickel, tin, zinc, iron, aluminum, and the like. Further examples include: antimony-doped tin oxide, phosphorous-doped tin oxide, needle shaped titanium oxide (the surface of which is coated with tin oxide/antimony), tin oxide, indium oxide, antimony oxide, zinc antimonate, and pigments obtained by coating tin oxide, and the like on a whisker surface of carbon or graphite; pigments obtained by coating at least one conductive metal oxide selected from a group consisting of tin-doped indium oxide (ITO), fluorine-doped tin oxide (FTO), phosphorous-doped tin oxide, and nickel oxide; pigments having conductivity containing tin oxide and phosphorus on the surface of titanium dioxide particles; and the like. These may be treated with the various surface treating agents described later. These may be used independently or two or more may be used in combination.

Furthermore, the conductive inorganic fine particles may be obtained by coating a conductive material such as a metal or the like on the surface of fibers such as glass fibers, silica alumina fibers, alumina fibers, carbon fibers, and the like, needle shaped reinforcing material such as aluminum borate whiskers, potassium titanate whiskers, and the like, or inorganic fillers such as glass beads, talc, mica, graphite, wollastonite, dolomite, and the like.

Insulating inorganic fine particles that can used in the present invention are not limited so long as the insulating inorganic materials are generally known, in other words, particles of inorganic materials having a volume resistivity of $10^{10}$ to $10^{18}$ Ω·cm. The shape thereof can be any shape such as a particle shape, flake shape, or fiber shape (including whiskers). Specific examples thereof include ceramic spherical particles, plate shaped particles, and fibers. Preferably used examples thereof include metal silicates such as alumina, iron oxide, copper oxide, mica, talc, and the like, and particles such as quartz, amorphous silica, glass, and the like. Furthermore, these may be treated with various surface treating agents described later. These may be used independently or two or more may be used in combination. When the insulating inorganic fine particles are added to the composition, the mechanical strength and dielectric breakdown strength of the curable elastomer composition cured product can be increased, with an increase in the specific dielectric constant also potentially being observed.

The amount of the insulating inorganic particles added is preferably within a range of 0.1 to 20 mass %, more preferably 0.1 to 5 mass %, with regard to the curable elastomer composition, based on the application. When the blended amount of the insulating inorganic particles deviates from the aforementioned preferred range, the effect of blending is not obtained, or there may be a lowering of the mechanical strength of the curable elastomer composition cured product.

Examples of thermally conductive inorganic fine particles that can be used in the present invention include: metal oxide particles such as magnesium oxide, zinc oxide, nickel oxide, vanadium oxide, copper oxide, iron oxide, silver oxide, and the like; and inorganic compound particles such as aluminum nitride, boron nitride, silicon carbide, silicon nitride, boron carbide, titanium carbide, diamond, diamond-like carbon, and the like. Zinc oxide, boron nitride, silicon carbide, and silicon nitride are preferable. When one or more of the thermally conductive inorganic fine particles is added to the composition, the thermal conductivity of the curable elastomer composition cured product can be increased.

The average particle size of the inorganic particles can be measured by a normal measurement method that is used in the field. For example, if the average particle size is approximately 50 nm or larger and 500 nm or less, the particle size is measured by observation using a microscope such as a transmission type electron microscope (TEM), a field emission type transmission electron microscope (FE-TEM), a scanning type electron microscope (SEM), a field emission type scanning electron microscope (FE-SEM), or the like, allowing the average value to be obtained as a measure of the average primary particle size. Meanwhile, if the average particle size is approximately 500 nm or more, the value of the average primary particle size can be directly obtained using a laser diffraction/scattering type particle size distribution measuring device or the like.

These inorganic particles may be treated to be hydrophobic by a surface treating agent. The surface treatment can be performed by treating (or coating) the filler with a surface treating agent. Examples of a hydrophobic surface treating agent include at least one surface treating agent selected from a group consisting of organic titanium compounds, organosilicon compounds, organic zirconium compounds, organic aluminum compounds, and organic phosphorus compounds. The surface treating agent may be used independently or two or more types may be used in combination. Of the surface treating agents, an organosilicon compound and particularly silazanes, silanes, siloxanes, and polysiloxanes are preferably used, and those with a silazane, alkyltrialkoxysilane, or trialkoxysilylpolydimethylsiloxane at one end are preferably used. Furthermore, the amount of treatment or the like at this time is equivalent to the treatment method, amount of treatment, and the like described in the surface treatment of a filler component.

[Other Optional Components]

The curable elastomer composition according to the present invention can contain an additive, adhesion improving agent, or the like in order to further improve the mold releasability or dielectric breakdown properties.

A film-like or sheet-like cured product obtained by curing the curable elastomer composition according to the present invention into a thin film can be preferably utilized for an adhesive film and an electroactive film (dielectric layer or electrode layer) forming a transducer. However, if the mold releasability of the cured layer is inferior when forming a thin film, if a film is manufactured at a particularly high speed, the film may be damaged due to mold releasing. Furthermore, in a dielectric layer used in an actuator, touch panel, or the like, the adhesion may need to be reduced in order to improve the sensitivity at low pressure. The curable elastomer composition of the present invention can improve the manufacturing speed of the film without damaging the film and the pressure-sensitive adhesion may be further reduced by adding another mold release agent.

Examples of mold releasability improving additives (mold release agents) that can be applied to the curable elastomer composition of the present invention include carboxylic acid based mold release agents, ester based mold release agents, ether based mold release agents, ketone based mold release agents, alcohol based mold release agents, and the like. One type thereof may be used independently, or two or more types thereof may be used in combination. Furthermore, examples of the mold release agents that can be used include mold release agents not containing silicon atoms, mold release agents containing silicon atoms, and mixtures thereof. Specific examples include those proposed in the aforementioned International Publication WO2014/105959.

The dielectric breakdown properties improving agent is preferably an electrical insulation improving agent and can be selected from a group consisting of hydroxides and salts of aluminum or magnesium, clay mineral, and mixtures thereof, specifically, aluminum silicate, aluminum sulfate, aluminum hydroxide, magnesium hydroxide, fired clay, montmorillonite, hydrotalcite, talc, and mixtures thereof. Furthermore, the insulation improving agent may be treated by a known surface treatment method. Specific examples include those proposed in the aforementioned International Publication WO2014/105959.

The adhesion improving agent (G) is for improving adhesion to a base material with which the curable elastomer composition of the present invention is in contact during curing. If the dielectric layer serving as the cured product of the composition will not be re-peeled, it is an effective additive. Examples of adhesion improving agents include vinyltriethoxysilane, allyltrimethoxysilane, allyltriethoxysilane, 3-glycidoxypropyltrimethoxysilane, 3-methacryloxypropyltrimethoxysilane, and other organic functional alkoxysilane compounds, along with siloxane derivatives thereof, particularly chain or three dimensional resinous siloxane derivatives substituted with an organic group containing fluorine. Particularly preferred examples of the adhesion improving agent include one or more types selected from:

(g1) reaction mixtures between an organoalkoxysilane containing an amino group and an organoalkoxysilane containing an epoxy group;

(g2) an organic compound having at least two alkoxysilyl groups per one molecule, in addition to containing bonds other than a silicon-oxygen bond between these silyl groups;

(g3) a silane containing an epoxy group expressed by the general formula:

$$R^a{}_n Si(OR^b)_{4-n}$$

(where $R^a$ represents an organic group containing a monovalent epoxy group, $R^b$ represents an alkyl group having a carbon number of 1 to 6, or a hydrogen atom (where n represents a number within a range of 1 to 3), or a partially hydrolyzed condensate thereof; and (g4) an alkoxysilane (except those having an organic group containing an epoxy group), or a partially hydrolyzed condensate thereof; and the like.

So long as a technical effect of the present invention is not impaired, examples of other optional components include: phenol based antioxidants, quinone based antioxidants, amine based antioxidants, phosphorus based antioxidants, phosphite based antioxidants, sulfur based antioxidants, thioether based antioxidants, and other antioxidants; triazole based light stabilizers, benzophenone based light stabilizers, and other light stabilizers; phosphoric ester based flame retardants, halogen based flame retardants, phosphorus based flame retardants, antimony based flame retardants, and other flame retardants; one or more antistatic agents including cation based surfactants, anion based surfactants, nonionic surfactants, and the like; dyes; pigments; and the like.

In Example 1, the curable elastomer composition of the present invention is preferably for a transducer device.

[Cured Product]

The present invention also relates to a cured product of the curable elastomer composition of the present invention. Young's modulus Y of the present invention cured product is in the range of 0.001 MPa to 10 MPa, preferably 0.001 MPa to 2 MPa, and more preferably 0.001 MPa to 1.5 MPa. The specific dielectric constant $\varepsilon_\gamma$ of the present invention cured product is 100 or less, preferably 50 or less, and more preferably in the range of 1 to 10. When the cured product is within the above ranges, an optimum cured product of a curable elastomer having mechanical properties and electrical properties suitable for forming a transducer device can be obtained.

The cured product of the curable elastomer composition of the present invention can suitably be prepared by uniformly mixing a curable organopolysiloxane and a component promoting a curing reaction, preferably components (A) to (C), and by adding and uniformly mixing other optional components and causing a curing reaction if necessary.

Mixing at ambient temperature may be performed using various stirrers or kneaders. Mixing under heat may be performed when combining components that are not cured during mixing. So long as curing does not occur during mixing, the adding order of the components is not particularly limited. When not used immediately after mixing, a crosslinking agent (for example, component (B)) and a curing reaction promoting component (for example, component (C)) may be stored separately in a plurality of containers so as to not be present in the same container, with the components in all containers capable of being mixed immediately prior to use.

The curing reaction of the curable elastomer composition of the present invention proceeds at room temperature for a curing reaction based on condensation reactions such as dehydration, de-alcoholization, and the like. However, if an organopolysiloxane cured film is produced by an industrial production process, the curing reaction is normally achieved by heating the composition or exposing the composition to active energy rays. The curing reaction temperature based on heating is not particularly limited, but is preferably 50° C. or higher and 200° C. or lower, more preferably 60° C. or higher and 200° C. or lower, and even more preferably 80° C. or higher and 180° C. or lower. Furthermore, the time for the curing reaction is dependent on the structure of the aforementioned components (A), (B), and (C) and is normally 1 second or more and 3 hours or less. Generally, the cured product can be obtained by being maintained within a range of 90 to 180° C. for 10 seconds to 30 minutes.

Examples of active energy rays that may be used in the curing reaction include ultraviolet rays, electron beams, radiation, and the like. Ultraviolet rays are preferable in terms of practicality. If the curing reaction is performed using ultraviolet rays, a catalyst for the hydrosilylation reaction having high activity to ultraviolet rays is used, for example, a bis(2,4-pentanedionato)platinum complex or a (methylcyclopentadienyl)trimethylplatinum complex is preferably added. The ultraviolet ray generating source is preferably a high pressure mercury lamp, a medium pressure mercury lamp, an Xe—Hg lamp, a deep UV lamp, or the like. The irradiation amount in this case is preferably 100 to 8,000 mJ/cm$^2$.

Electronic Components or Display Devices

The present invention also relates to an electronic component or display device having a cured product of the present invention. Electronic components and display devices of the present invention preferably include electronic materials, particularly transducer members (including those for sensors, speakers, actuators, and generators).

Film

The present invention also relates to a film including the cured product of the present invention.

Thickness, Uniformity and Flatness

The cured film of the present invention is a thin film, and the average thickness of the film is suitably within a range of 0.1 to 200 μm, preferably 0.1 to 150 μm, and more preferably 0.1 to 100 μm. Herein, the average thickness of the film is the average value of the thickness at the center of the film. Preferably, the film of the present invention is uniform and flat, with the difference between the thickness at one end and the thickness at the center being within 5.0% in the width direction of the film. The average value of the thickness of the center of the film is more preferably within a range of 5 to 200 μm. The width direction of the film is the direction orthogonal to the length direction of the film and generally refers to the direction orthogonal in the planar direction with regard to the direction in which a curable elastomer composition, which is a raw material, is coated onto a base material. Note that when the film is rolled, the rolling direction is the length direction, and the width direction of the film is a direction orthogonal thereto. For a quadrilateral or essentially quadrilateral film, the width direction of the film may be the direction orthogonal to the long axis direction, while for a square or essentially square film, the width direction may either be the direction orthogonal or the direction parallel to any side of the square film. The film of the present invention has a difference (absolute value) between the thickness (μm) of an end and thickness (μm) of the center within 5.0%, preferably within 4.0%, and particularly preferably within 3.5%, in the width direction of the film. Note that the film is preferably a flat and uniform structure with essentially no unevenness on the surface, including rises at both ends. The maximum displacement (difference) of the thickness in the film width direction is preferably within 5.0%. The film is particularly preferably flat, with essentially no unevenness, and having a maximum displacement (difference) of the thickness of the entire film within 5.0%. In particular, a flat film has an advantage of being less prone to bubble entrainment, deformation and defects originating from unevenness between the films when not only a single layer, but a plurality of film layers are overlaid to form a uniform thick film layer.

The film of the present invention has an average thickness per film within a range of 0.1 to 200 μm; however, a plurality of films can be overlaid to form a laminated film exceeding 200 μm, which can be used to form an adhesive layer or dielectric layer. In particular, a dielectric film forming a dielectric layer obtained by laminating two or more films is included in the scope of the present invention.

[Film Size]

The film of the present invention is preferably of a certain size (area). The film width is preferably 30 mm or more, while the film area is preferably 900 mm$^2$ or more. Such a film is, for example, a film having a length of 30 mm on each side. Meanwhile, the film of the present invention may have a structure in which a curable composition of a raw material is uniformly coated and cured even on a release layer, allowing it to be used without limitation in the length direction, even at a length in which rolling is possible on a roller. Needless to say, the film may be cut into a desired size and shape before use.

[Dielectric Breakdown Strength]

The dielectric breakdown strength of the film of the present invention can be measured with the method described above using a rigid electrode. In order to avoid variations in the measurement value of the dielectric breakdown strength at an arbitrary position of the film, the dielectric breakdown strength is measured in at least 10 arbitrary positions on the film and the standard deviation value is preferably sufficiently low.

Specifically, the film of the present invention preferably has a dielectric breakdown strength measured at room temperature that is within a range of 50 V/μm to 200 V/μm, and more preferably 70 V/μm to 150 V/μm. In the case the film of the present invention is uniform, containing almost no microscopic defects, the standard deviation value of the dielectric breakdown strength will be sufficiently low, within a range of 0.1 to 10.0 V/μm, and preferably 0.1 to 5.0 V/μm. In the case the number of the film surface and internal defects is high, variations in the number of defects inside and on the surface of the film may increase, potentially resulting in cases in which the standard deviation value of the dielectric breakdown strength may exceed 10.0 V/μm. In this case, reliability of the obtained film is reduced.

[Specific Dielectric Constant]

The film of the present invention can be easily designed so that the specific dielectric constant of the entire film at 1 kHz and 25° C. is 100 or less. The specific dielectric constant can be designed based on the amount of high dielectric functional groups introduced, using a high dielectric filler, or the like, and a film having a specific dielectric constant of 50 or less or 1 to 10 can be obtained.

[Mechanical Properties]

The macroscopic mechanical properties such as hardness, tear strength, and tensile strength of the film of the present invention are generally the same as those of a film designed with the same chemical composition, film thickness, and shape. As an example, the product of the present invention can be designed to have the following mechanical properties measured when heated and molded into a sheet having a thickness of 2.0 mm, based on JIS K 6249.

(1) The Young's modulus (MPa) at room temperature is 0.001 to 10 MPa, suitably within 0.001 to 2 MPa, and in particular, suitably within a range of 0.001 to 1.5 MPa.

(2) The tear strength (N/mm) at room temperature is 1 N/mm or higher, particularly preferably within a range of 2 N/mm or higher.

(3) The tensile strength (MPa) at room temperature is 1 MPa or higher, particularly preferably within a range of 2 MPa or higher.

(4) The elongation at break (%) can be 200% or higher, particularly preferably within a range of 200 to 1,000%.

When the film of the present invention is used in an application as an electronic material such as a touch panel and the like, electronic member for a display device, and particularly a transducer material such as a sensor or the like, the shear storage modulus at 23° C. is preferably within a range of $10^3$ to $10^5$ Pa, more preferably $1.0 \times 10^3$ to $5.0 \times 10^4$ Pa·0.

Regarding other mechanical properties, the compressive residual strain (%) of the film of the present invention is preferably less than 10%, more preferably less than 5%, and particularly preferably 4% or less. However, with the film of the present invention, a material having a compressive residual strain (%) of less than 3% can be designed.

[Laminate]

The present invention also relates to a laminate body including the film and the release layer of the present invention. Preferably, the laminate body is a film provided with the cured product of the present invention which is laminated on a film base material provided with a release layer having a release coating ability in a removable state.

Laminate Body Manufacturing Method

The present invention also relates to a method of manufacturing a laminate body, including:

a step of applying a thin film of the curable elastomer composition of the present invention on a separator having a release layer, where the thickness after curing is 1 to 1,000 μm, suitably 1 to 200 μm, and more suitably 1 to 100 μm; and a step of curing the curable elastomer composition applied in a thin film.

After the curable elastomer composition described above is applied to a film-type base material, a tape-type base material, or a sheet-type base material (hereinafter referred to as "film-type base material"), a method corresponding to a curing mechanism of the laminate body of the present invention can be used for curing enabling forming on the surface of the base material.

The base material is particularly preferably a flat base material having a release surface, and the curable elastomer composition is preferably coated on the release surface. The base material functions as a separator. Thereby, the film of the present invention laminated on the base material can be smoothly separated from the release layer with slight force and adhered to an electronic device or the like, advantageously imparting excellent handling workability.

Examples of types of base materials include paperboard, cardboard paper, clay-coated papers, polyolefin laminate papers, particularly polyethylene laminate papers, synthetic resin films and sheets, natural fiber woven materials, synthetic fiber woven materials, artificial leather woven materials, and metal foils. Synthetic resin films and sheets are particularly preferable, with examples of synthetic resins including polyimide, polyethylene, polypropylene, polystyrene, polyvinyl chloride, polyvinylidene chloride, polycarbonate, polyethylene terephthalate, and nylon. When heat resistance is required, a heat-resistant synthetic resin film such as a polyimide, polyetheretherketone, polyethylene naphthalate (PEN), liquid crystal polyacrylate, polyamide-imide, polyether sulfone, and the like is particularly preferable. Meanwhile, for applications such as a display device in which visibility is required, a transparent base material and specifically a transparent material such as a polypropylene, polystyrene, polyvinylidene chloride, polycarbonate, polyethylene terephthalate, PEN, and the like is preferable.

The base material is preferably a film-like or a sheet-type base material. The thickness thereof is not particularly limited, but is normally approximately 5 to 300 μm. Furthermore, in order to improve the adhesion between a supporting film and pressure sensitive adhesive layer, a supporting film subjected to a primer treatment, corona treatment, etching treatment, or plasma treatment may be used. Furthermore, the opposite surface of the film-type base material from the pressure sensitive adhesive layer surface may be subjected to surface treatments such as a treatment for scratch prevention, grime prevention, fingerprint adhesion prevention, anti-glare, anti-reflection, anti-static, or other treatment.

The method of coating the curable elastomer composition of the present invention on a base material can be, without limitation, gravure coating, offset coating, offset gravure coating, roll coating using an offset transfer roll coater or the like, reverse roll coating, air knife coating, curtain coating using a curtain flow coater or the like, comma coating, Meyer bar, or other conventionally known methods used for the purpose of forming a cured layer. In addition, a plurality of layers of the curable elastomer composition of the present invention can be applied. In this case, the curable elastomer composition may be continuously applied a plurality of times and then cured, or a curable elastomer composition can be cured, then the curable elastomer composition can be applied thereon and then cured.

The release layer may also be referred to as a release liner, a separator, a release type layer, or a release coating layer, and may preferably be a release layer having a release coating ability such as a silicone-based release agent, a fluorine-based release agent, an alkyd-based release agent, a fluorosilicone-based release agent, or the like, or may be formed as a release layer which is not prone to adhering to the release layer or cured layer of the present invention by forming physically fine irregularities in the surface of the base material. In particular, in the film of the present invention, a release layer obtained by curing a fluorosilicone based release agent is preferably used as the release layer.

[Manufacturing Method Using Rolling Process]

The method for manufacturing a laminate body of the present invention may further include a rolling process.

The curable elastomer composition of the present invention is particularly preferably obtained by coating on a base material, and then rolling, before or after a curing reaction. The rolling process can be performed on a cured product in a cured or semi-cured state, but roll processing an uncured curable elastomer composition and then curing by heating or the like to obtain a flat and uniform film is preferable. In addition, when performing the rolling process, a flat and uniform film is particularly preferably obtained by rolling an entire laminated body where the uncured curable elastomer composition is coated between separators having a release layer described later, and then curing by heating or the like.

The amount of the curable elastomer composition coated onto the base material must be such that the average thickness of the film after curing is 1 to 200 μm, and is a thickness where rolling is possible.

The rolling process can be performed by coating the curable elastomer composition onto a base material and using a well-known rolling method such as roller rolling or the like. Note that the cured or semi-cured cured product may be essentially molded into a sheet if necessary and then rolled. The rolled film needs to have an average film thickness in the range of 1 to 200 μm. In particular, roller rolling has an advantage where the film with a desired thickness can be designed by adjusting a gap between rollers. For example, a film having excellent flatness and very few defects on the film surface and inside the film can be obtained by adjusting the gap between the rollers to a constant level where the average thickness is within a range of 1 to 200 μm, and then rolling. More specifically, for roller rolling, the gap between the rollers is particularly preferably adjusted to be within a range of 2.0 to 4.0 times the average thickness of the target film. For example, in order to obtain a film having a thickness of 50 μm, the thickness of the release layer is in particular preferably in the range of 100 to 200 μm. In particular, when the gap is wider than the aforementioned upper limit, a void originating from air bubbles may not be sufficiently eliminated, and defects on the film surface and inside the film may increase.

As described above, the rolling process is preferably performed in an uncured condition by coating the curable elastomer composition onto the base material. Specifically, raw material curable elastomer composition is preferably applied onto a sheet-type base material provided with a release layer, roll processed by roll rolling or the like, and then the flattened curable elastomer composition is heated or the like for curing to obtain the film of the present invention.

The method of coating the curable elastomer composition before rolling onto the substrate, the base material, and the like are the same as described above, and a cured product containing a fluoroalkyl group having the aforementioned primer layer and flattening layer may be subjected to a rolling process such as roller rolling or the like.

Design Method for Curable Elastomer

The present invention also relates to a method of designing a curable elastomer composition, including:

a step of selecting components such that the cured product satisfies the following formula

[Eq. 12]

$$E = \alpha \left( \frac{Y}{\varepsilon_0 \varepsilon_r} \right)^{0.5}$$

(where, E is the dielectric breakdown strength in the range of 50 V/μm to 200 V/μm measured using a rigid electrode, α is a constant in the range of 0.4 to 0.9, Y is Young's modulus and is in the range of 0.001 MPa to 10 MPa, $\varepsilon_\gamma$ is a specific dielectric constant and is 100 or less, and $\varepsilon_0$ represents the dielectric constant of vacuum).

In the formula described above, E is a value measured using a rigid electrode, and is 50 V/μm to 200 V/μm, preferably 70 V/μm to 150 V/μm.

In the formula described above, α is 0.4 to 0.9, preferably 0.6 to 0.85. In this design method, the closer the surface roughness of the obtained cured film is to smooth, the higher the value of α can be.

In the formula described above, Y is 0.001 MPa to 10 MPa, preferably 0.001 MPa to 2 MPa, and more preferably 0.001 MPa to 1.5 MPa.

In the formula described above, $\varepsilon_\gamma$ is 100 or less, preferably 50 or less, and more preferably in the range of 1 to 10.

When E, α, Y, and $\varepsilon_\gamma$ as described above are within the above ranges, design of a curable elastomer composition that satisfies the mechanical properties and electrical properties required for an electroactive polymer material used in a transducer device is feasible.

Transducer Device Design Method

The present invention also relates to a method for designing a transducer device, including:

a step of using a cured product of the curable elastomer composition selected according to the method for designing the curable elastomer composition according to claim 15. The curable elastomer composition of the present invention is particularly useful as a dielectric layer of a transducer, and a transducer can be formed by arranging electrode layers at both ends of the cured product of the curable elastomer composition. In addition, the curable elastomer composition of the present invention containing conductive inorganic particles can be used as an electrode layer.

With the present invention, the term "transducer" means a component, machine, or device for converting one type of energy into another type of energy. Examples of transducers include: artificial muscles and actuators to convert electrical energy to mechanical energy; sensors and power generation elements for the conversion of mechanical energy to electrical energy; speakers, microphones, and headphones for the conversion of electrical energy to sound energy; fuel cells for the conversion of chemical energy to electrical energy; and light emitting diodes for the conversion of electrical energy to optical energy.

The transducer provided with the cured product of the curable elastomer composition of the present invention can particularly include a plurality of layers of the cured product in the form of a film or a sheet. Transducers provided with a film or sheet that is a cured product of a multi-layer curable elastomer composition can generate large forces, and by laminating the plurality of layers, a larger displacement can be obtained.

Examples of an electrode for manufacturing a transducer include: in addition to the cured product of the curable elastomer composition of the present invention, metals and alloys such as gold, platinum, silver, palladium, copper, nickel, aluminum, titanium, zinc and zirconium, iron, cobalt, tin, lead, indium, chromium, molybdenum, manganese, and the like; metal oxides such as indium tin oxide compound (ITO), antimony oxide compound (ATO), ruthenium oxide, titanium oxide, zinc oxide, tin oxide, and the like; carbon materials such as carbon nanotubes, carbon nanohorns, carbon nanosheets, carbon fibers, carbon black, and the like; and conductive resins such as poly(ethylene-3,4-dioxythiophene) (PEDOT), polyaniline and polypyrrole and the like. The electrode may contain the materials described above alone or may contain two or more kinds of materials.

Transducers including a cured product of the curable elastomer composition of the present invention can operate in air, water, vacuum, or in organic solvents. In addition, the transducer can be properly sealed according to the environment in which the transducer is used. The sealing method is not particularly limited, and for example, a resin material or the like can be used for sealing.

The film of the cured product of the curable elastomer composition selected according to the design method of the curable elastomer composition of the present invention does not readily undergo dielectric breakdown when energized by applying a high voltage, and the film as a whole achieves high level electrical properties such as high dielectric breakdown strength and high level mechanical properties such as tear strength, tensile strength, and elongation, enabling satisfying all properties necessary as a transducer device. Therefore, the curable film of the curable elastomer composition selected according to the design method of the curable elastomer composition of the present invention in the form of a single layer or laminated film is in particular suitable for designing an actuator as a transducer device member activated at high voltage for converting an electrical signal into physical motion.

EXAMPLES

The present invention will be described below by way of examples; however, the present invention is not limited thereto. The following compounds were used in the Examples shown below.

Component (a1-1): Dimethylsiloxane polymer (amount of vinyl groups: 0.24 mass %, siloxane polymerization degree: 300) blocked at both ends with a vinyldimethylsiloxy group Component (a1-2): 3,3,3-trifluoropropylmethyl, dimethylsiloxane copolymer (amount of vinyl groups: 0.26 mass %, siloxane polymerization degree: 193) blocked at both ends with a vinyldimethylsiloxy group Component (b1): Dimethylsiloxy-methylhydrosiloxy-siloxane copolymer blocked at both ends with a trimethylsiloxy group (amount of silicon-bonded water: 0.71 mass %)

Component (b2): Dimethylsiloxane polymer blocked at both ends with a dimethyhydrosiloxy group (amount of silicon-bonded water: 0.02 mass %)

Component (b3): Dimethylsiloxane/3,3,3-trifluoropropylmethylsiloxane/methylhydrogen siloxane copolymer (amount of silicon-bonded hydrogens (wt %) is approximately 0.23) blocked at both ends with a trimethylsiloxy group Component (b4): Dimethylsiloxane/3,3,3-trifluoropropylmethylsiloxane copolymer (amount of silicon-bonded hydrogens (wt %) is approximately 0.014) blocked at both ends with a dimethyhydrosiloxy group Component (c1): Dimethyl siloxane polymer solution blocked at both ends by a vinyldimethylsiloxy group (approximately 0.6 wt % in platinum concentration) of a platinum-1,3-divinyl 1,1,3,3-tetramethyldisiloxane complex Component (e1): 1-ethynyl-1-cyclohexanol Component (e2): 1,3,5,7-tetramethyl-1,3,5,7-tetravinyl-cyclotetrasiloxane Component (f1): Fumed silica treated with hexamethyldisilazane (product name prior to treatment: AEROSIL® 200)

Component (f2): Fumed silica treated with hexa methyldisilazane (product name prior to treatment: AEROSIL® 50)

Component (f3): Fumed silica treated with hexa methyldisilazane and 1,3-bis(3,3,3-trifluoropropyl)-1,1,3,3-tetramethyldisilazane (product name prior to treatment: AEROSIL® 200)

Component (f4): Fumed silica treated with hexa methyldisilazane and 1,3-bis(3,3,3-trifluoropropyl)-1,1,3,3-tetramethyldisilazane (product name prior to treatment: AEROSIL® 50)

[Viscosity Prior to Curing]

The viscosity prior to the curing of each composition was measured using a viscoelasticity measuring device (manufactured by Anton Paar, model number MCR102). Measurements were performed using a 20 mm diameter, 2° cone-plate with different shear rates. The overall viscosities of the compositions measured at 25° C. and shear rates of 0.1 (s−1) and 10.0 ($S^{-1}$) were recorded, respectively.

[Measurement of Mechanical Physical Properties of Cured Product]

The compositions were press cured at 110° C. for 15 minutes, then further post-cured at 110° C. for 45 minutes in an oven to obtain a cured product. The tear strength of the obtained cured product was measured based on JIS-K6249, while the tensile strength, breaking elongation, and Young's modulus were measured. Note that in order to measure mechanical strength, the thickness of the sheet was set to 2 mm. Moreover, the durometer A hardness of a sheet having a thickness of 6 mm was measured.

[Measurement of Relative Dielectric Constant of Cured Product]

Similarly, a sheet having a thickness of 1 mm was prepared, and the specific dielectric constant was measured with an impedance analyzer 4990EDMS-050 (manufactured by Toyo Corporation) at room temperature in a frequency range of 100 Hz to 1 MHz. The value of the specific dielectric constant at 100 KHz of the cured product sheets in Examples 1 and 2 was 3 and 5.

[Measurement of Dielectric Breakdown Strength of Cured Product]

The compositions were made into a thin film using a coater and cured at 110° C. for 60 minutes to prepare a sheet with a thickness of 0.01 mm. The obtained sheets were used to measure the dielectric breakdown strength using a POR-TATEST 100A-2, an electrical insulation oil breakdown voltage testing device provided with a rigid electrode manufactured by Soken Electric Co., Ltd. For each cured product sheet sample, sixteen points were measured within an area of 10 cm×10 cm, and the average value was taken as the dielectric breakdown strength.

Example 1

A liquid curable organopolysiloxane composition is prepared by blending the aforementioned component (a1-1) at 70.58 wt %, component (f1) at 22.10 wt %, component (f2) at 4.35 wt %, component (b1) at 0.99 wt %, component (b2) at 3.83 wt %, component (c1) at 0.10 wt %, and component (e1) at 0.04 wt %. Here, the silicon atom-bonded hydrogen atoms (Si—H) of components (b1) and (b2) were used at an amount of approximately 1.2 mols per 1 mol of vinyl groups in the composition. The viscosity before curing was 218 Pa-s at 0.1 ($S^{-1}$) and 26 Pa-s at 10.0 ($S^{-1}$).

Example 2

A liquid curable organopolysiloxane composition is prepared by blending the aforementioned component (a1-2) at 68.36 wt %, component (b3) at 5.06 wt %, component (b4) at 5.06 wt %, component (c1) at 0.10 wt %, component (f3) at 18.88 wt %, component (f4) at 2.34 wt %, and component (e2) at 0.28 wt %. Here, the silicon atom-bonded hydrogen atoms (Si—H) of components (b3) and (b4) were used at an amount of approximately 1.2 mols per 1 mol of vinyl groups in the composition. The viscosity before curing was 148 Pa-s at 0.1 ($S^{-1}$) and 16 Pa-s at 10.0 ($S^{-1}$).

TABLE 1

| Examples | Specific dielectric constant | Tear strength $(N/mm)^{-1}$ | Tensile strength/ MPa | Elongation % | Hardness | Young's modulus/ MPa | Dielectric breakdown strength/V/$\mu m^{-1}$ | $\alpha$ |
|---|---|---|---|---|---|---|---|---|
| 1 | 3 | 12.5 | 7.0 | 457 | 38 | 0.9 | 132 | 0.72 |
| 2 | 5 | 3.7 | 5.6 | 297 | 37 | 0.9 | 120 | 0.84 |

INDUSTRIAL APPLICABILITY

The applications of the curable elastomer composition cured film of the present invention is not limited to those disclosed above, with the use thereof possible in various flat panel displays (FPD) for displaying characters, symbols, or images, such as television receivers, monitors for a computer, monitors for a mobile information terminal, monitors for monitoring, video cameras, digital cameras, mobile phones, mobile information terminals, displays for an instrument panel of an automobile and the like, displays for an instrument panel of various equipment, and devices, automatic ticket machines, automatic teller machines, and the like. Application thereof is possible as a device for CRT displays, liquid crystal displays, plasma displays, organic EL displays, inorganic EL displays, LED displays, surface electrolytic displays (SEDs), field emitting displays (FEDs), and other display devices, or touch panels using the display devices. Similarly, the film of the present invention is a film-type or sheet-type member having excellent electrical and mechanical properties including dielectric breakdown strength, and has a high specific dielectric constant and mechanical strength (specifically, tensile strength, tear strength, elongation percentage, and the like). Therefore, the film of the present invention can be used as an electronic material, a member for a display device, or a member for a transducer (including sensors, speakers, actuators, and generators) and can be particularly preferably used as an electroactive film (dielectric layer or electrode layer) forming a transducer. Specific methods of use involving a well-known method using a dielectric layer or pressure-sensitive adhesive layer can be used without limitation.

Furthermore, by using the design method of the curable elastomer composition of the present invention, a cured product film that is a film-type or sheet-type having superior electrical properties and mechanical properties including dielectric breakdown strength and a high specific dielectric constant and mechanical strength (specifically, tensile strength, tear strength, elongation percentage, and the like) can readily be designed or selected. Furthermore, by selecting or designing a curable elastomer composition that provides a cured product having these parameters and using the film shaped or sheet shaped member thereof, a transducer device provided with the necessary performance and superior practicality can readily be designed.

The invention claimed is:

1. A curable elastomer composition, comprising a compound having a fluoroalkyl group, wherein a cured product of the curable elastomer composition satisfies the following formula:

$$E = \alpha \left( \frac{Y}{\varepsilon_0 \varepsilon_r} \right)^{0.5}$$

where E is the dielectric breakdown strength in the range of 50 V/$\mu$m to 200 V/$\mu$m measured using a rigid electrode, $\alpha$ is a constant in the range of 0.4 to 0.9, Y is Young's modulus and is in the range of 0.001 MPa to 10 MPa, $\varepsilon_\gamma$ is a specific dielectric constant and is 100 or less, and $\varepsilon_0$ represents the dielectric constant of vacuum;

wherein the curable elastomer composition comprises:

(A) an organopolysiloxane with a curing reactive group having at least two carbon-carbon double bonds in one molecule;

(B) an organohydrogenpolysiloxane having at least two silicon atom-bonded hydrogen atoms and a fluoroalkyl group in one molecule;

(C) a hydrosilylation reaction catalyst; and (F) a filler treated with a fluoroalkyl-substituted disilazane.

2. The curable elastomer composition according to claim 1, which is cured by one or more curing reaction mechanisms selected from hydrosilylation reaction curing, condensation reaction curing, radical reaction curing, and an energy ray curing reaction.

3. The curable elastomer composition according to claim 1, wherein component (A) is an organopolysiloxane or mixture thereof including:

(a1) a straight chain or branched chain organopolysiloxane having an alkenyl group only at an end of a molecular chain; and optionally (a2) an organopolysiloxane resin containing an alkenyl group having at least one branched siloxane unit in a molecule with vinyl (CH$_2$=CH—) group content within a range of 1.0 to 5.0 mass %.

4. The curable elastomer composition according to claim 1, wherein the organopolysiloxane (A) comprises a fluoroalkyl group.

5. The curable elastomer composition according to claim 1, wherein the organohydrogenpolysiloxane (B) comprises a fluoroalkyl group expressed by (C$_p$F$_{2p+1}$)—R— where R represents an alkylene group with 1 to 10 carbon atoms, and p represents an integer between 1 and 8.

6. The curable elastomer composition according to claim 1, suitable for a transducer device.

7. A cured product, comprising the curable elastomer composition according to claim 1.

8. An electronic component or display device, comprising the cured product according to claim 7.

9. A film, comprising the cured product according to claim 7.

10. A laminate body, comprising the film according to claim 9 and a release layer.

11. A method of manufacturing a laminate body, comprising:

applying a thin film of the curable elastomer composition according to claim 1 on a separator having a release layer, where the thickness after curing is 1 to 1,000 $\mu$m; and curing the curable elastomer composition applied in a thin film.

12. The method according to claim 11, further comprising a rolling process.

13. A method of designing a curable elastomer composition, the method comprising:

selecting components such that a cured product of the curable elastomer composition satisfies the following formula:

$$E = \alpha\left(\frac{Y}{\varepsilon_0\varepsilon_r}\right)^{0.5}$$

where E is the dielectric breakdown strength in the range of 50 V/μm to 200 V/μm measured using a rigid electrode, α is a constant in the range of 0.4 to 0.9, Y is Young's modulus and is in the range of 0.001 MPa to 10 MPa, $\varepsilon_\gamma$ is a specific dielectric constant and is 100 or less, and $\varepsilon_0$ represents the dielectric constant of vacuum;

wherein the curable elastomer composition is according to claim 1.

14. A method of designing a transducer device, the method comprising:

using a cured product of the curable elastomer composition selected according to the method according to claim 13.

15. The curable elastomer composition according to claim 1, wherein:

component (A) is a linear or branched organopolysiloxane having terminal carbon-carbon double bonds; and component (B) comprises;

(b3) a dimethylsiloxane/3,3,3-trifluoropropylmethylsiloxane/methylhydrogen siloxane copolymer having two terminals blocked with trimethylsiloxy groups, or (b4) a dimethylsiloxane/3,3,3-trifluoropropylmethylsiloxane copolymer having two terminals blocked with dimethylhydrosiloxy groups.

16. The curable elastomer composition according to claim 1, wherein the fluoroalkyl-substituted disilazane is 1,3-bis(3,3,3-trifluoropropyl)-1,1,3,3-tetramethyldisilazane.

17. The curable elastomer composition according to claim 16, wherein the filler (F) comprises:

(f3) a first filler treated with 1,3-bis(3,3,3-trifluoropropyl)-1,1,3,3-tetramethyldisilazane and having a first specific surface area; and (f4) a second filler treated with 1,3-bis(3,3,3-trifluoropropyl)-1,1,3,3-tetramethyldisilazane and having a second specific surface area;

wherein the first specific surface area is greater than the second specific surface area.

18. The curable elastomer composition according to claim 1, further comprising:

(e2) 1,3,5,7-tetramethyl-1,3,5,7-tetravinyl-cyclotetrasiloxane.

19. A curable elastomer composition, comprising a compound having a fluoroalkyl group, wherein a cured product of the curable elastomer composition satisfies the following formula:

$$E = \alpha\left(\frac{Y}{\varepsilon_0\varepsilon_r}\right)^{0.5}$$

where E is the dielectric breakdown strength in the range of 50 V/μm to 200 V/μm measured using a rigid electrode, α is a constant in the range of 0.4 to 0.9, Y is Young's modulus and is in the range of 0.001 MPa to 10 MPa, $\varepsilon_\gamma$ is a specific dielectric constant and is 100 or less, and $\varepsilon_0$ represents the dielectric constant of vacuum;

wherein the curable elastomer composition comprises:

(a1-2) 3,3,3-trifluoropropylmethyl, dimethylsiloxane copolymer having two terminals blocked with vinyldimethylsiloxy groups;

(b3) a dimethylsiloxane/3,3,3-trifluoropropylmethylsiloxane/methylhydrogen siloxane copolymer having two terminals blocked with trimethylsiloxy groups;

(b4) a dimethylsiloxane/3,3,3-trifluoropropylmethylsiloxane copolymer having two terminals blocked with dimethylhydrosiloxy groups;

(c1) dimethyl siloxane polymer solution having two terminals blocked with a vinyldimethylsiloxy group of platinum-1,3-divinyl 1,1,3,3-tetramethyldisiloxane complex;

(e2) 1,3,5,7-tetramethyl-1,3,5,7-tetravinyl-cyclotetrasiloxane;

(f3) a first filler treated with 1,3-bis(3,3,3-trifluoropropyl)-1,1,3,3-tetramethyldisilazane and having a first specific surface area; and (f4) a second filler treated with 1,3-bis(3,3,3-trifluoropropyl)-1,1,3,3-tetramethyldisilazane and having a second specific surface area;

wherein the first specific surface area is greater than the second specific surface area.

20. The curable elastomer composition of claim 19, wherein:

component (a1-2) is present in the composition in an amount of about 68 wt. %;

component (b3) is present in the composition in an amount of about 5 wt. %;

component (b4) is present in the composition in an amount of about 5 wt. %;

component (c1) is present in the composition in an amount of about 0.1 wt. %;

component (e2) is present in the composition in an amount of about 0.3 wt. %;

component (f3) is present in the composition in an amount of about 19 wt. %; and component (f4) is present in the composition in an amount of about 2 wt. %;

such that all components (a1-2) to (f4) total about 100 wt. %.

* * * * *